United States Patent [19]

Oka et al.

[11] Patent Number: 4,696,592
[45] Date of Patent: Sep. 29, 1987

[54] PAPER FEED CONTROL IN A PRINTER

[75] Inventors: Yukihiko Oka, Yamatokoriyama; Toyohiko Morimoto, Nara, both of Japan

[73] Assignee: Sharp Kabushiki Kaisha, Osaka, Japan

[21] Appl. No.: 736,711

[22] Filed: May 22, 1985

[30] Foreign Application Priority Data

May 22, 1984 [JP] Japan .................................. 59-104205
May 23, 1984 [JP] Japan .............................. 59-75996[U]
May 25, 1984 [JP] Japan .................................. 59-106779

[51] Int. Cl.⁴ .............................................. B41J 13/02
[52] U.S. Cl. ...................................... 400/636; 400/642
[58] Field of Search .................... 400/1, 3, 4, 5, 6, 7, 400/9, 10, 11, 12, 74, 578, 601, 612, 615.2, 636, 642, 673, 670, 703, 707.5, 708, 708.1, 710, 368

[56] References Cited

U.S. PATENT DOCUMENTS

| | | | |
|---|---|---|---|
| 1,684,702 | 9/1928 | Heimers | 400/670 |
| 3,421,612 | 1/1969 | Pitt | 400/636 X |
| 3,512,132 | 5/1970 | Jones et al. | 400/5 X |
| 3,808,363 | 4/1974 | Kieffer | 400/368 X |
| 3,840,107 | 10/1974 | Mack et al. | 400/636 X |
| 3,987,884 | 10/1976 | Buxton | 400/615.2 X |
| 4,056,183 | 11/1977 | Beery | 400/636 X |
| 4,078,485 | 3/1978 | Guthrie | 400/636 X |
| 4,243,330 | 1/1981 | Wallace et al. | 400/636 X |
| 4,386,265 | 5/1983 | Sugimori | 400/636 X |

FOREIGN PATENT DOCUMENTS

| | | | |
|---|---|---|---|
| 0053468 | 3/1983 | Japan | 400/601 |
| 0019184 | 1/1984 | Japan | 400/710 |
| 2026392 | 2/1980 | United Kingdom | 400/642 |

OTHER PUBLICATIONS

IBM Technical Disclosure Bulletin, "Speed Enhancenent to Check Inscriber", Tulp et al., vol. 26, No. 8, Jan. 1984, pp. 3982-3983.

*Primary Examiner*—Ernest T. Wright, Jr.
*Attorney, Agent, or Firm*—Birch, Stewart, Kolasch & Birch

[57] ABSTRACT

A print control system in a banking machine performs a validation printing, wherein the printing operation of the same printing data is repeatedly conducted by shifting the record receiving paper sheet in the direction along the printing line after the completion of the one line data printing. The print control system includes a paper feeding mechanism which tightly holds the record receiving paper sheet while the actual printing operation is conducted, and shifts the record receiving paper sheet along the printing line by a predetermined distance after the completion of the actual printing operation.

5 Claims, 14 Drawing Figures

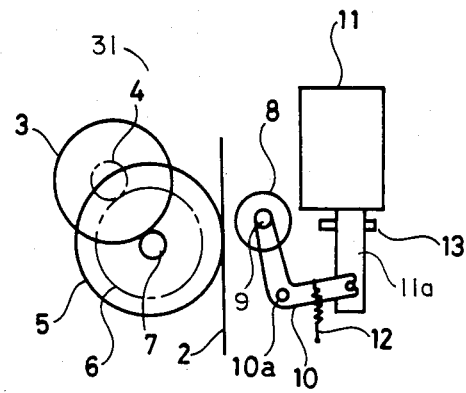
FIG.4
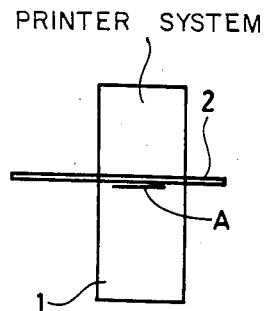
FIG.1
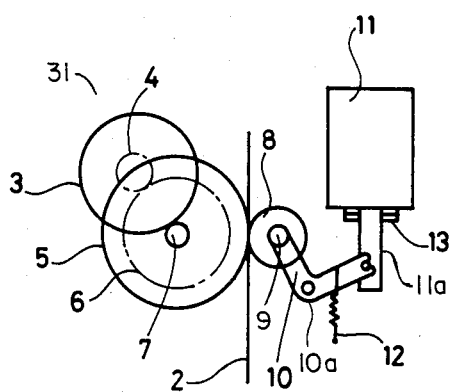
FIG.5
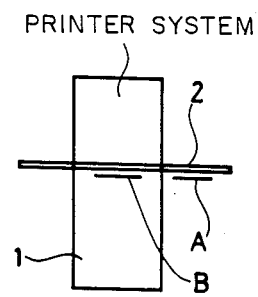
FIG.2
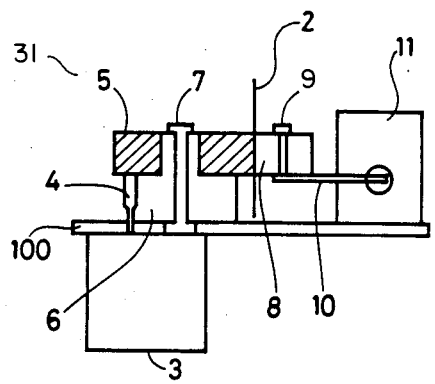
FIG.6
FIG.3

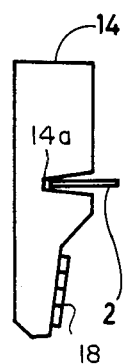
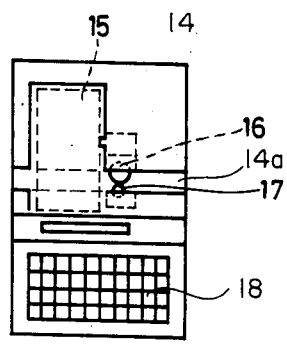
FIG.7  FIG.8
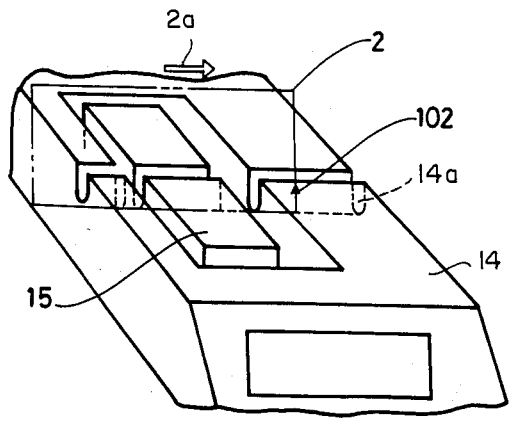
FIG.9
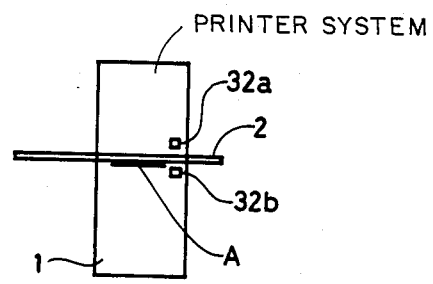
FIG.11

PAPER FEED CONTROL IN A PRINTER

BACKGROUND OF THE INVENTION

1. Field of the Invention

The present invention relates to a paper feed control system in a printer and, more particularly, to a paper feed control system which feeds a record receiving paper sheet in a direction of the printing line.

2. Description of the Prior Art

For example, in a banking machine, to conduct a validation printing, the validation data is printed on stacked impact papers. In this case, the printing is not conducted on the plain paper. To conduct the validation printing on the plain paper, the record receiving paper sheet must be positioned at a predetermined printing position each time the validation printing is conducted by the same validation data. Thus, the validation printing in the conventional system is troublesome.

OBJECTS AND SUMMARY OF THE INVENTION

1. Objects of the Invention

Accordingly, an object of the present invention is to provide a print control system, wherein a plurality of printing operations are automatically conducted on a record receiving paper when the record receiving paper is automatically set at a predetermined position.

Another object of the present invention is to provide a paper feed control system in a printer, which shifts a record receiving paper sheet along the printing line, thereby ensuring a plurality of printing operations on the same printing line.

Still another object of the present invention is to provide a print control system which conducts the validation printing wherein the same validation data is printed on a same record receiving paper sheet a desired number of times by shifting the record receiving paper sheet along the printing line when one printing operation is completed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

2. Summary of the Invention

To achieve the above objects, pursuant to an embodiment of the present invention, a paper feed mechanism is provided in a printer system so as to shift the record receiving paper sheet in the direction of the printing line when one printing operation is completed. When a print instruction is developed after the record receiving paper sheet is set at a predetermined position, the printing operation is conducted to print out a print data on the record receiving paper sheet. After completion of the printing operation, the record receiving paper sheet is shifted in the direction of the printing line and, then, the printing operation is carried out with the same printing data. These operations are repeated so that the printing operation of the same data is repeated by a desired number of times on a same printing line.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 1 and 2 are schematic plan views of a printer system related to the present invention;

FIG. 3 is a schematic plan view of a record receiving paper for explaining an operational mode of a print control system of the present invention;

FIGS. 4 and 5 are plan views of an embodiment of a paper feed control mechanism of the present invention, wherein FIG. 4 shows one operational mode, and FIG. 5 shows another operational mode;

FIG. 6 is a side view of the paper feed control mechanism of FIGS. 4 and 5;

FIG. 7 is a schematic side view of a banking machine which employs the print control system of the present invention;

FIG. 8 is a plan view of the banking machine of FIG. 7;

FIG. 9 is a perspective view of a printer unit portion included in the banking machine of FIGS. 7 and 8;

FIG. 11 is a schematic plan view of another print system related to another embodiment of a print control system of the present invention;

DESCRIPTION OF THE PREFERRED EMBODIMENTS

Figure 10:
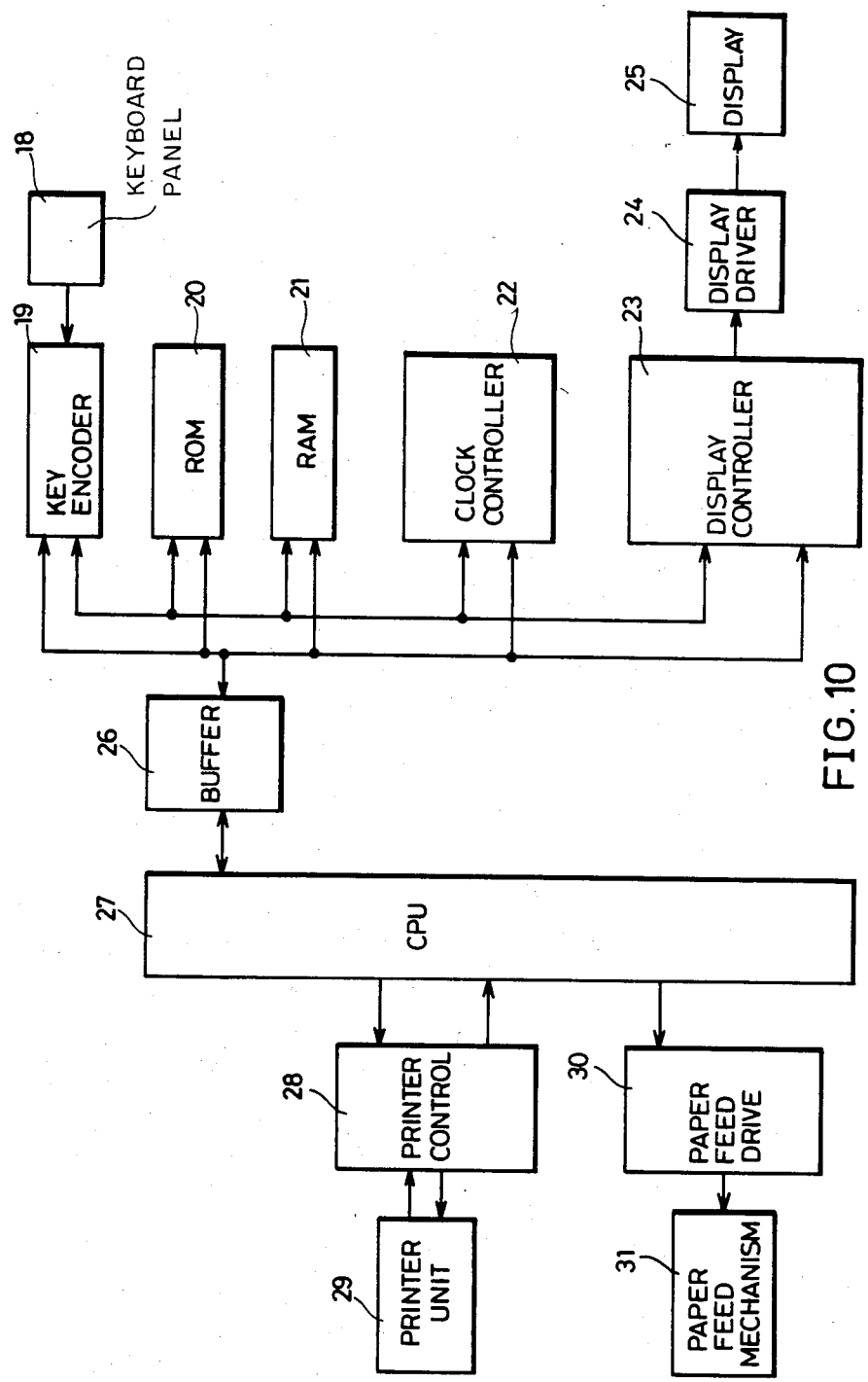
FIG. 10 is a block diagram of an embodiment of a print control system of the present invention.

FIG. 1 schematically shows a printer system related to a paper feed control system of the present invention. A record receiving paper sheet 2 is inserted in a printer system 1 so as to conduct the printing on the record receiving paper sheet 2. At the first step, the printing operation is carried out in a normal manner so that the print data is printed on a portion A. After completion of the first printing operation, the record receiving paper sheet 2 is driven to travel in the direction of the printing line by a predetermined distance and, then, a second printing (marked B in FIG. 2) is formed on the same record receiving paper sheet 2 at the same printing line. Thus, the record receiving paper sheet 2 bears the first printing (marked A) and the second printing (marked B) on the same printing line as shown in FIG. 3.

As discussed above, the printing operation is carried out in accordance with the following steps in a print control system of the present invention. First, a print instruction is introduced from a keyboard panel 18 after the record receiving paper sheet 2 is set at a predetermined position in the printer system 1. In response to the print instruction, the record receiving paper sheet 2 is tightly held by the printer system 1, and the actual printing operation is carried out. After completion of the actual printing operation, the record receiving paper sheet 2 is shifted by a paper feed mechanism 31 in the direction along the printing line by a predetermined distance. Then, the record receiving paper sheet 2 is tightly held by the printer system 1 to perform the actual printing operation. When the second actual printing operation is completed, the record receiving paper sheet 2 is released from the printer system 1.

FIG. 4 shows a paper feed mechanism 31 related to the print control system of the present invention. The paper feed mechanism 31 includes a pulse motor 3 to which a gear 4 is secured. The gear 4 is mechanically engaged to another gear 6 which is secured to a rotation shaft 7 of a drive roller 5. A pinch roller 8 confronts the drive roller 5 so as to support the record receiving paper sheet 2 between the drive roller 5 and the pinch roller 8. A shaft 9 of the pinch roller 8 is coupled to an arm 10 at one end thereof. The other end of the arm 10 is secured to a moving rod 11a of a solenoid 11. The arm 10 is rotatable around a supporting point 10a. A spring 12 is secured to the arm 10 so that the arm 10 is pulled in the clockwise direction around the supporting point 10a. The tension force of the spring 12 reaches the moving rod 11a of the solenoid 11 so that the moving rod 11a of the solenoid 11 is pulled out to a maximum protruding position when the solenoid 11 is in an "off" state. When the solenoid 11 is activated, the moving rod 11a of the solenoid 11 is pulled into the solenoid 11 to a minimum protruding position which is determined by an e-shaped ring 13 secured to the moving rod 11a of the solenoid 11.

When the print instruction command is introduced from the keyboard panel 18 after the record receiving paper sheet 2 is located at a predetermined position, the solenoid 11 is activated to attract the moving rod 11a of the solenoid 11. The pinch roller 8 is depressed against the driver roller 5 so as to tightly support the record receiving paper sheet 2 therebetween as shown in FIG. 5. The actual printing operation is carried out under the following conditions. While the actual printing operation is conducted, the drive roller 5 is held stationary by the pulse motor 3 so that the record receiving paper sheet 2 is tightly held at a predetermined position.

When the actual printing is completed, the pulse motor 3 is driven to rotate by a predetermined rotation angle so as to rotate the drive roller 5 by a predetermined angle. The record receiving paper sheet 2 is driven to travel in the direction along the printing line by a predetermined distance. Thereafter, the second actual printing is conducted while the drive roller 5 is held stationary. When the second actual printing operation is completed, the solenoid 11 is deenergized to separate the pinch roller 8 from the record receiving paper sheet 2, thereby releasing the record receiving paper sheet 2 from the printer system 1. The repetition number of the actual printing operation is selected by the operator's choice. FIG. 6 is a side view of the paper feed mechanism of FIGS. 4 and 5. In FIG. 6, the reference numeral 100 represents a base plate included the printer system 1.

FIGS. 7 and 8 show a banking machine which includes a print control system of the present invention. A V-shaped groove portion 14a is formed near the center of a machine body 14. A printer system 15 is disposed around the V-shaped groove 14a, and the record receiving paper sheet 2 is inserted into the V-shaped groove 14a. A paper feed mechanism including a drive roller 16 and a pinch roller 17 is disposed near the printer system 15. FIG. 9 is an enlarged perspective view of the printer portion included in the banking machine of FIGS. 7 and 8. The leading edge of the record receiving paper sheet 2 is manually located at a mark 102 before the actual printing operation is conducted. The paper feed operation is conducted in the direction shown by an arrow 2a in FIG. 9.

FIG. 10 shows an embodiment of a print control system of the present invention. The print control system includes a keyboard panel 18. The key input signal developed from the keyboard panel 18 is encoded by a key encoder 19. The control system includes a read only memory (ROM) 20, a random access memory (RAM) 21, and a clock controller 22. The print control system is associated with a display unit 25 of, for example, a banking machine, via a display control circuit 23 and a display driver circuit 24. A buffer 26 is disposed between a central processing unit (CPU) 27 and the above-mentioned elements, namely, the key encoder 19, the ROM 20, the RAM 21, the clock controller 22 and the display control circuit 23. The print data stored in the RAM 21 is transferred to the buffer 26 line by line. That is, the print data of one length is temporarily stored in the buffer 26 to conduct the actual printing operation. When a print instruction is developed from the keyboard panel 18, the one line print data temporarily stored in the buffer 26 is transferred to a printer control circuit 28 in accordance with the instructions generated from the CPU 27. The printer control circuit 28 activates a printer unit 29 so as to print out the print data on the record receiving paper sheet 2. When the one line printing is completed, the print completion indicating signal is applied to the CPU 27, whereby the CPU 27 functions to develop a paper feed instruction to a paper feed driver circuit 30. In response thereto, a paper feed mechanism 31 is enabled so as to shift the record receiving paper sheet 2 in the direction along the printing line. When the record receiving paper sheet 2 is shifted by a predetermined length, the CPU 27 functions to disable the paper feed driver circuit 30, thereby holding the record receiving paper sheet 2 at the next printing position. Under these conditions the printer control circuit 28 is enabled to perform the next printing operation. These operations are repeated a desired number of times.

Figure 12:
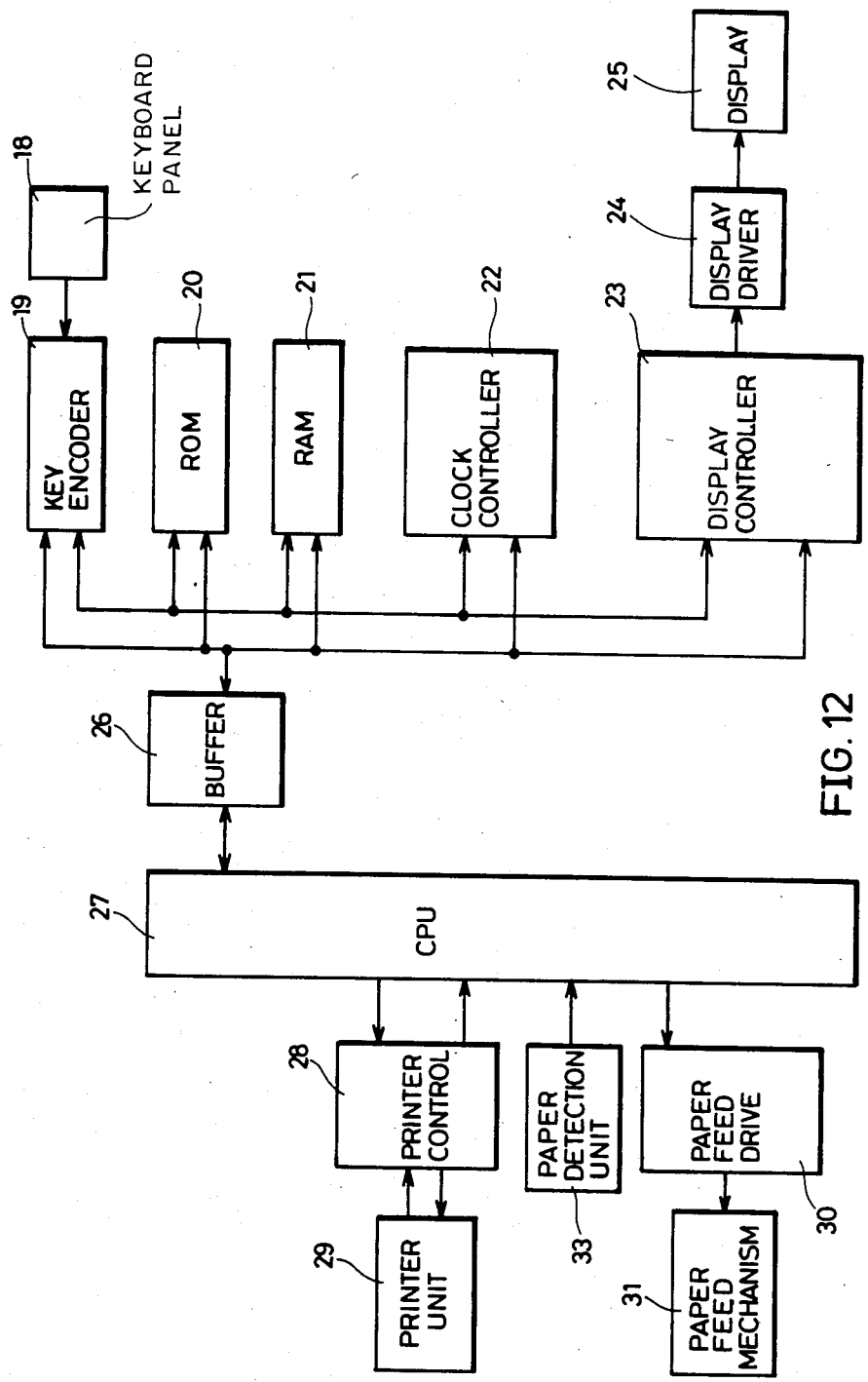
FIG. 12 is a block diagram of the print control system related to the printer system of FIG. 11.

FIG. 11 shows another embodiment of a printer system 1 related to the present invention, wherein an optical direction system is installed in the printer system 1 in order to detect whether the record receiving paper sheet 2 is located at a predetermined position. The optical detection system includes a light emitting element 32a, and a light responsive element 32b between which the record receiving paper sheet 2 is driven to travel. FIG. 12 shows a print control system related to the printer system of FIG. 11. Like elements corresponding to those of FIG. 10 are indicated by like numerals. A paper detection unit 33 includes the above-mentioned light emitting elements 32a and the light responsive element 32b. The CPU 27 checks the condition detected by the paper detection unit 33 so that the actual printing operation is not carried out when the record receiving paper sheet 2 is not set in the printer system 1.

Figure 13:
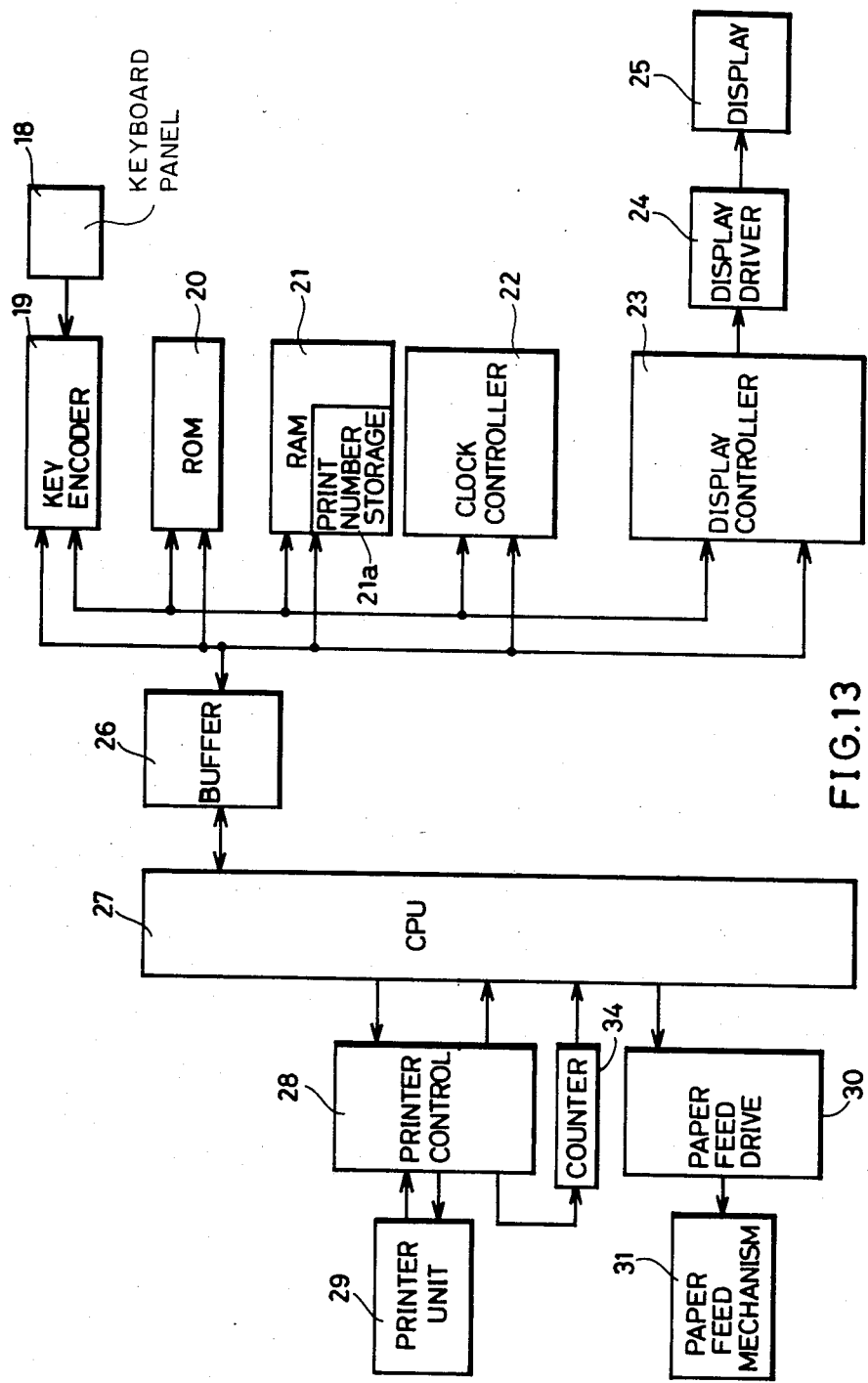
FIG. 13 is a block diagram of still another embodiment of a print control system of the present invention.

FIG. 13 shows still another embodiment of the print control system of the present invention. Like elements corresponding to those of FIG. 10 are indicated by like numerals. In this embodiment, a desired print repetition number is preset in a print repetition number storage section 21a provided in the RAM 21. A counter 34 is associated with the printer control circuit 28 so as to count the number of the actual printing operation performed with the same print data. The contents stored in the counter 34 are applied to the CPU 27, whereby the actual printing operation is performed a desired number of times which is preset in the print repetition number storage section 21a.

Figure 14:
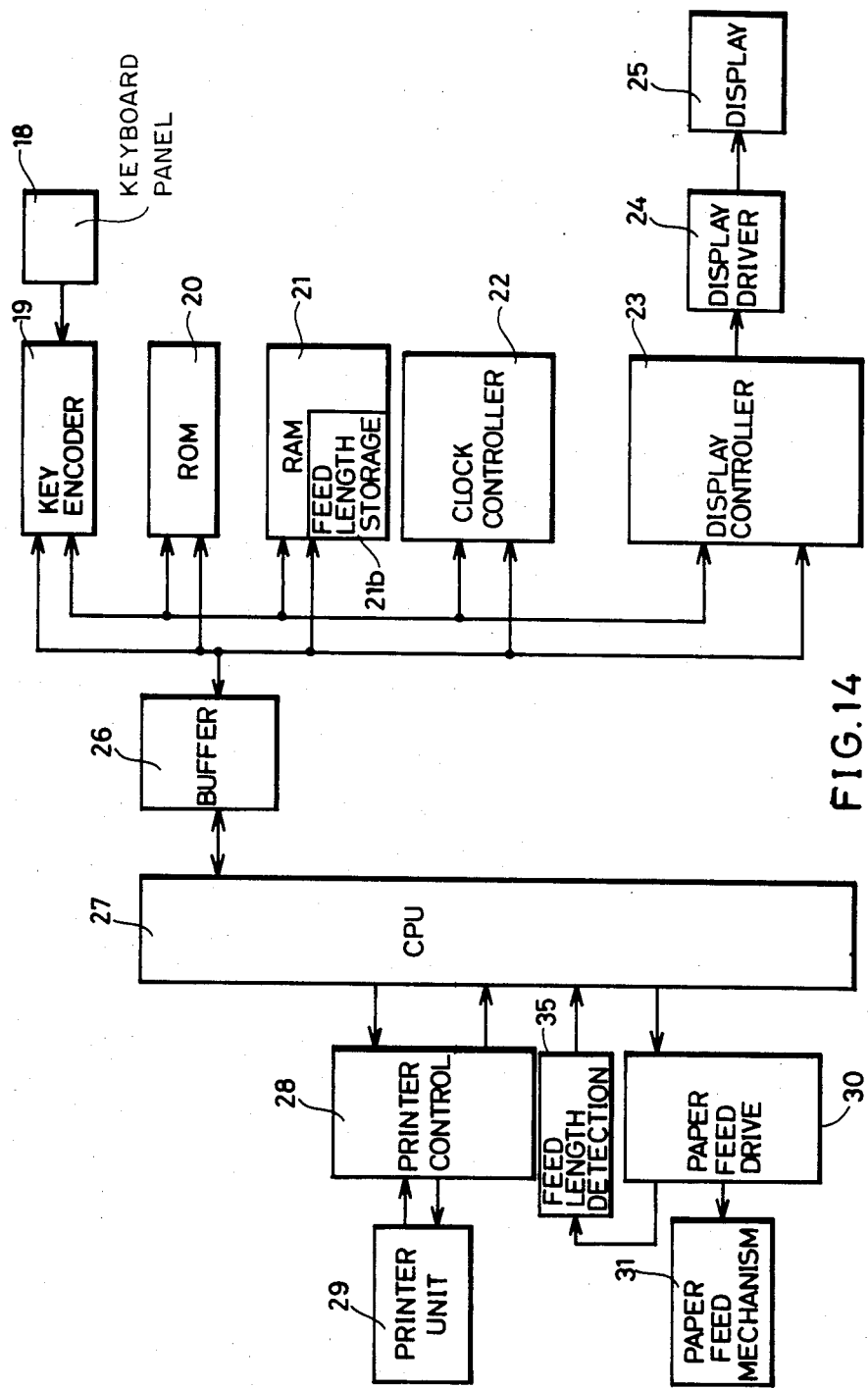
FIG. 14 is a block diagram of a further embodiment of a print control system of the present invention.

FIG. 14 shows a further embodiment of the print control system of the present invention, wherein the feed length of the record receiving paper sheet 2 is preset. Like elements corresponding to those of FIG. 10 are indicated by like numerals. A feed length storage section 21b is provided in the RAM 21 in order to preset a desired paper feed length. A paper feed length detection unit 35 is associated with the paper feed driver circuit 30 in order to detect the actual feed length of the record receiving paper sheet 2. The detected feed length is applied from the paper feed length detection unit 35 to the CPU 27 so as to control the feed length in accordance with the preset value stored in the feed length storage section 21b.

The invention being thus described, it will be obvious that the same may be varied in many ways without departure from the spirit and scope of the invention, which is limited only by the following claims.

What is claimed is:

1. A print control system in a printer which performs a printing operation onto a record-receiving medium, said print control system comprising:

input means for introducing a print instruction into said print control system;

printing means for performing said printing operation onto said record-receiving medium;

feed means for shifting said record-receiving medium through said printing means in a predetermined direction for a predetermined distance before and after said printing operation;

a print repetition control circuit which enables a predetermined number of successive printing operations by said printing means upon completion of each printing operation; and control means, responsive to said input means, for controlling said printing means and said feed means in said printing operation;

said feed means including, drive roller means for engaging and shifting said record-receiving medium through said printing means as said drive roller means rotates, means for rotating said drive roller means only before and after each successive printing operation, said means for rotating holding said drive roller means stationary during each printing operation, pinch roller means in opposing confrontation with said drive roller means for selectively securing said record-receiving medium against said drive roller means in each printing operation, a shaft positioned through the axis of said pinch roller means so that said pinch roller means rotates freely therearound, a solenoid having a reciprocally movable rod, and a rotatable arm engaged with the shaft of said pinch roller means and with a portion of said reciprocally movable solenoid rod, wherein said solenoid is selectively activated by said control means to position said pinch roller means in contact with said record-receiving medium, thereby securing said record-receiving medium against said drive roller means during a printing operation.

2. The print control system of claim 1, wherein said feed means is enabled when a first printing operation is completed, and said print repetition control circuit is enabled after said feed means is disabled.

3. The print control system of claim 1, further comprising a paper sheet detection unit which detects whether said record-receiving medium is located at a predetermined position when said print instruction is introduced.

4. The print control system of claim 1, further comprising:

print repetition number preset means for storing a desired print repetition number; and a counter which counts the number of said printing operations performed by said printing means;

said print repetition control circuit being activated by said control means until the contents stored in said counter reach said print repetition number preset in said print repetition number preset means.

5. The print control system of claim 1, further comprising:

feed length preset means for storing a desired record-receiving medium feed length;

a feed measuring unit which detects the actual feed length conducted by said feed means; and means for disabling said feed means when said actual feed length detected by said feed measuring unit reaches said desired feed length stored in said feed length preset means.

* * * * *